March 19, 1963
D. F. PRZYBYLSKI
3,081,891
MATERIAL HANDLING APPARATUS
Filed July 16, 1958
3 Sheets-Sheet 1
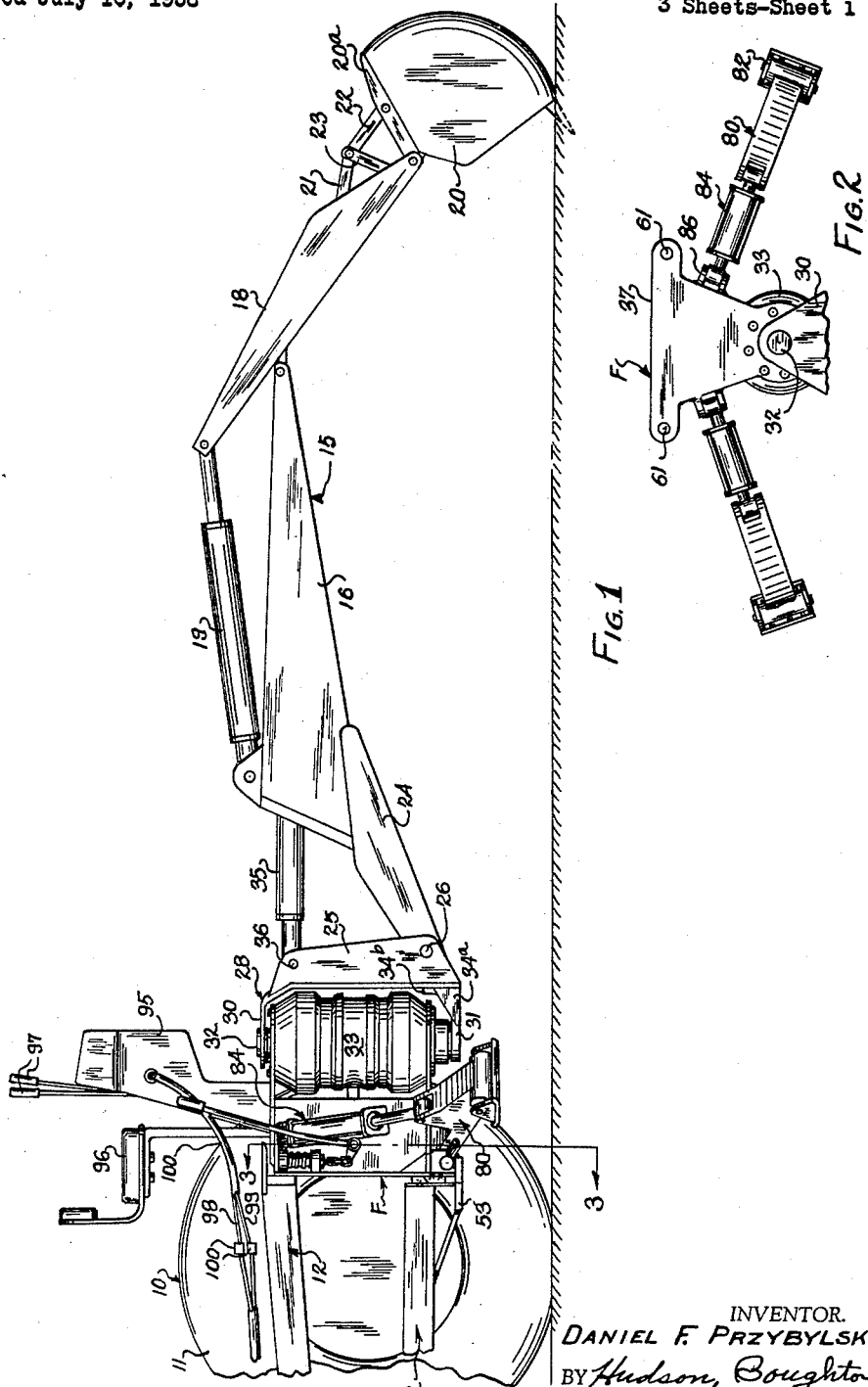
INVENTOR.
DANIEL F. PRZYBYLSKI
BY Hudson, Boughton,
Williams, Davids Hoffmann
ATTORNEYS March 19, 1963 D. F. PRZYBYLSKI 3,081,891
MATERIAL HANDLING APPARATUS
Filed July 16, 1958 3 Sheets-Sheet 2

INVENTOR.
DANIEL F. PRZYBYLSKI
BY Hudson, Doughton
Williams, David & Hoffmann
ATTORNEYS

United States Patent Office 3,081,891
Patented Mar. 19, 1963

3,081,891
MATERIAL HANDLING APPARATUS
Daniel F. Przybylski, Winona, Minn., assignor to The Warner & Swasey Company, Cleveland, Ohio, a corporation of Ohio
Filed July 16, 1958, Ser. No. 748,909
5 Claims. (Cl. 214—138)

The present invention relates to a demounting arrangement for vehicle mounted equipment and more particularly to equipment used in connection with material handling and material moving apparatuses and the like of a type which can be mounted upon a vehicle or other apparatus and demounted therefrom.

One of the primary objects of the present invention is to provide a mounted equipment demounting arrangement which is simple and efficient in operation and has a minimum number of controls demountable therewith of a simple configuration and operation.

Another object of the present invention is to provide a demounting arrangement of simple configuration for demounting and parking mounted equipment from a vehicle or other apparatus quickly and efficiently with the equipment remaining intact and ready for remounting.

Another object is to provide an improved and novel demounting arrangement for removing a whole crane, shovel, or hoe structure from a vehicle without dismantling, so that the complete structure can be parked as a unit and remain readily available for easy remounting on the vehicle.

An additional object of the invention is the provision of a demounting apparatus for mounted equipment such as material handling apparatus comprising cooperating releasable latch and pivotal connections between the equipment and a vehicle or other apparatus, which pivotal connection can be readily disconnected upon the release of the latch connection.

A still further object is the provision of the demounting apparatus referred to in the preceding object further comprising a plurality of power operated downwardly extendable and upwardly retractable stabilizer legs for at least partially supporting the equipment when demounted.

An additional object is to provide a completely hydraulically operated boom which can be easily demounted and mounted by a novel and simple pivotal support and latching arrangement, the arrangement being provided with a pair of hydraulically operated stabilizer legs having footing adapted to extend laterally on either side of the boom.

A further object of the invention is the provision of a boom comprising a main boom having a control pedestal and an operator's seat mounted on one end thereof and a dipper stick having an earth moving tool secured to the other or outer end thereof which can be completely demounted as a unit from a motor vehicle or other apparatus and left standing, ready for remounting, upon a pair of laterally extended, retractable stabilizer legs and balanced at a third point upon the tool mounted on the end of the dipper stick.

The invention further resides in certain novel features of construction, combinations and arrangements of parts, and further objects and advantages of the invention will be apparent to those skilled in the art to which it pertains from the following description of the present preferred embodiment thereof described with reference to the accompanying drawings forming a part of this specification and wherein the same reference characters represent corresponding parts throughout the several views, and in which:

FIG. 1 is a fragmentary side elevational view of a vehicle embodying the present invention of a demounting arrangement for an equipment comprising an earth moving apparatus with stabilizer legs retracted, but with an outer end of the equipment, and more particularly, a tool end of a dipper stick resting upon the ground;

FIG. 2 is a fragmentary top plan view of the demounting arrangement in FIG. 1, but with a control pedestal and an operator's seat removed;

Figure 3:
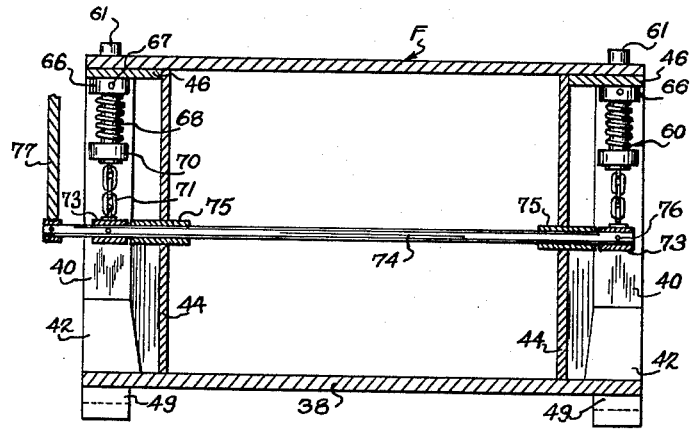
FIG. 3 is a sectional view of the demounting arrangement taken along line 3—3 of FIG. 1.
Figure 4:
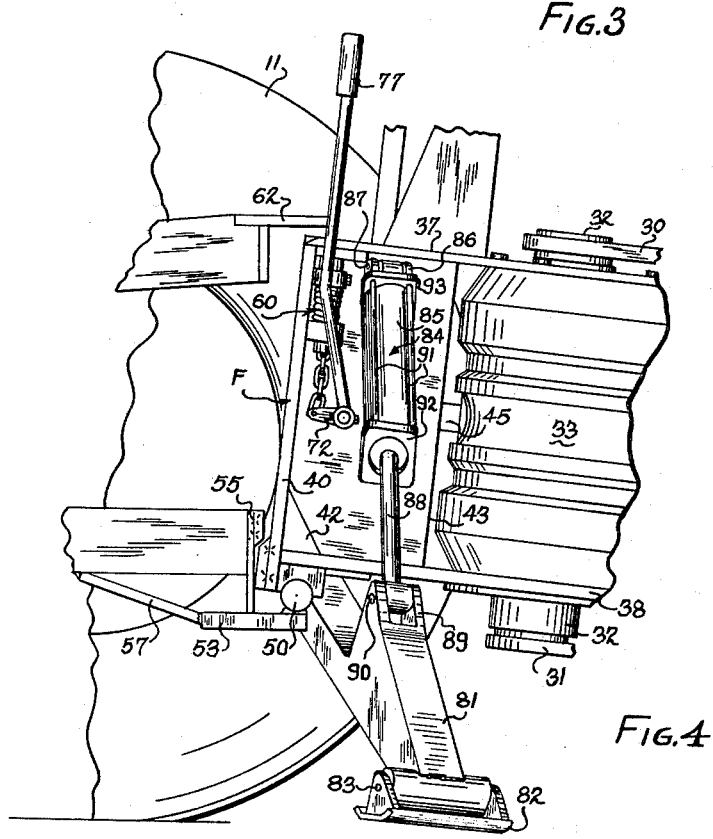
FIG. 4 is a fragmentary view similar to FIG. 1, but with the equipment being shown in a partially disconnected position relative to the vehicle.

It is to be understood that the invention is not limited to the details of construction and arrangements of parts shown in the drawing and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, a vehicle 10, preferably a motor vehicle such as a tractor having a pair of rear drive wheels 11, only one being shown, is illustrated as having an equipment unit 15 demountably supported on a support frame 12 disposed between the rear wheels 11 and forming part of the vehicle frame. The unit 15 includes a box-like frame detachably connected to the frame 12 and adapted to support the equipment to be mounted on the vehicle. In the preferred and illustrated embodiment the equipment is earth handling equipment and earth moving apparatus, comprising a main boom 16 having a dipper stick 18 pivotally connected intermediate its ends to the outer end of boom 16, but the earth handling apparatus may take on many different forms. An extensible hydraulic stick motor 19, is pivotally connected to the inner end of the main boom 16 on the upper side thereof and to the inner end of the dipper stick 18 and is operable to tilt the latter about its pivotal connection on the boom 16.

A disconnectable material handling and earth moving shovel 20 is connected to a mounting plate 20a hingedly connected upon the outer end of the dipper stick 18, so as to operate as a backhoe. An extensible hydraulic tilt motor 21 is pivotally connected at its inner end to the inside of the housing forming the dipper stick 18 and at its outer end to one end of a link 22 connected at its other end to the shovel supporting plate 20a and to the upper ends of a pair of radius levers 23, the lower ends of the radius levers 23 being pivotally connected to the dipper stick 18 adjacent the outer end thereof.

An obliquely downwardly extending inner end portion 24 of the main boom 16 is pivotally connected between the lower ends of a pair of substantially vertically extending bracket plates 25 by means of a transverse pivot pin 26. The parallel bracket plates 25 are integrally connected to a generally C-shaped carrier member 28 by conventional means such as by welding, which carrier member 28 is formed with a pair of generally horizontal, parallel, and forwardly extending upper and lower legs 30, 31, respectively, keyed to a generally vertically extending drive shaft 32 of a vane type fluid swing motor 33. The rigid connection of the lower leg 31 with the upper leg 30 is effected by suitable reinforcing means such as symmetrically disposed gusset plates 34a and a vertically arranged rectangular fillet pad 34b. It is understood that the swing motor 33 can be of any other type of power device or arrangement for swinging the boom 15 through a substantially horizontal arc of, for example, approximately 190°, about an axis coaxial with the drive shaft 32 of the motor 33.

A boom lift extensible hydraulic motor 35 has its inner end pivotally connected to the upper ends of the parallel bracket members 25 by means of a transversely disposed pin 36 which is substantially parallel to the pivot pin 26. The outer end of the hydraulic motor 35 is disposed below the stick cylinder 19 and partially encased within the main boom 16 where it is pivotally connected for lifting the boom 16.

It is to be understood that hydraulic motors 19, 21, and 35 are preferably of the double acting type and are to be supplied with pressure fluid and controlled in a conventional manner by valve means preferably demountable with boom and operating motors.

The vane type swing motor 33, which normally has a substantially vertical axis, is rigidly secured within the rigid box-like frame F between the rear end portions of upper and lower, substantially horizontal and forwardly extending, trapezoidally-shaped, support plates 37, 38, respectively. The upper and lower ends of the housing of the swing motor 33 are preferably bolted to the support plates 37 and 38, respectively. However, it is to be understood that the swing motor 33 can be connected to the plates 37, 38 in any other conventional manner.

The box-like frame F further comprises a pair of substantially vertically extending and laterally spaced rectangular bars 40, connecting the forward ends of the upper plate 37 with the lower plate 38, see FIG. 3. Preferably, a pair of gusset plates 42 are provided to re-enforce the connection of the bars 40 with the lower plate 38. A vertical, transverse plate 43 interconnects a pair of laterally spaced apart and obliquely disposed rocker support panel plates 44 extending vertically between the upper and lower support plates 37 and 38, the motor 33 being rigidly secured to the transverse plate 43 by a lug 45 by welding. The plates 37, 38 diverge forwardly and outwardly to form an acute angle therebetween. A pair of spacer bars 46 are rigidly secured beneath the upper plate 37 adjacent the outer lateral ends thereof for locating and re-enforcing the connection of the panels 44 therewith.

The unit 15 is adapted to be principally supported upon the tractor frame 12 by means of a pair of laterally or transversely spaced apart bearing blocks 49, having aligned semicylindrical concave recesses, which seat on correspondingly disposed cylindrical stub shafts or trunnions 50. The unit 15 is pivotally supported for turning about the transverse, horizontal trunnions 50 while being mounted on or dismounted from the tractor 10. The bearing blocks 49 are secured to the underside of the forwardmost end of lower support plate 38 and in juxtaposition with a pair of downwardly protruding lower end portions of the bars 40. The transversely spaced apart and coaxial cylindrical trunnions 50 are supported by a transversely extending sill 53 secured to the frame 12 by plates 55, 57.

The unit 15 includes a pair of retractable latching assemblies 60 associated with the box-like frame F. The latching assemblies each have a retractable latch or plunger member 61 having a beveled, forward facing ramp on its upper end. The latch members 61 are supported by the frame F and are retractable within the upper support plate 37 to release the equipment supporting unit from the tractor and are projectable above the upper support plate 37 for entering latching recesses formed in a cross member 62 carried by the frame 12. The cross member 62 is a substantially horizontal member having a transverse dimensional width substantially the same as the lower sill 53 and the member 37.

Each latch member 61 is provided with a collar 66 immovably secured thereto by conventional means, such as a setscrew 67. Each collar 66 is so positioned on its plunger or latch member 61 so that when the same is fully extended, the plunger 61 projects above the top plate 37 only a predetermined amount. Each plunger 61 is biased vertically upwardly by a helical compression spring 68 interposed between the collar 66 and a substantially parallel supporting lug 70 disposed below the collar 66 and rigidly secured to one of the vertical support bars 40. Each supporting lug 70 is formed with a central opening of sufficient diametrical dimension to permit the movement of the lower terminal end of a plunger 61 therethrough. A chain 71 is connected to the lower end of each plunger 61, which extends through and is guided in the lug 70, and at its other end is pivotally connected to a lever or rocker arm 72, integrally formed with a sleeve 73 disposed over an adjacent portion of a rocker shaft 74. The rocker shaft 74 extends through substantially aligned openings in the panels 44 and is journaled therein by means of aligned bushings 75 rigidly secured in the panel openings by welding.

Each sleeve 73 is nonrotatably connected to the rocker shaft 74 by means of a bolt 76 passed through the sleeve 73 and the rocker shaft 74 and secured therein by conventional means, such as a nut secured to the threaded end thereof. The latch members or plungers 61 can be retracted from a normally vertically upwardly projected position by tilting a lever arm 77 in a counterclockwise direction, FIG. 1, which lever arm 77 is fixed on a terminal end of the rocker shaft 74.

Two laterally spaced apart pairs of complementary locking blocks 78 and 79 are respectively rigidly secured to the rear face of the transverse plate 55 of the equipment support frame 12 and the forward faces of the lower ends of the rectangular bars 40 of the box-like mounting frame. As seen in FIG. 1, the complementary locking blocks have beveled mating edges which are obliquely upwardly and rearwardly extending in order to permit the separation thereof in a rearward and upward direction but essentially proscribes movement of the blocks 79 in a vertically upward direction.

In addition to the releasable latching arrangement, the frame F is additionally comprised of a pair of outwardly and rearwardly extending stabilizer leg assemblies 80 comprising two legs 81 pivotally connected at its upper end to the lower edges of the panels 44 and the outer sides of the support plates 38. Each stabilizer leg 81 is provided with a foot or shoe 82 pivotally connected to the lowermost or outer end thereof by means of a transverse pin 83.

A power device 84 is provided for each stabilizer leg 81 on either side of the box-like frame. Each power device 84 is comprised of a hydraulic stabilizer cylinder 85, pivotally secured at its upper end to a support bracket 86 connected to the upper support plate 37 by means of a transverse pivot pin 87, and a piston rod 88 having a piston on one end operatively disposed in the cylinder 85 and the outer end being pivotally connected between an upwardly extending bifurcated portion 89 on the corresponding leg 81 by means of a pivot pin 90, so that the jackleg 81 can be extended and retracted by respectively raising and lowering the same upon properly introducing hydraulic pressure fluid into the hydraulic device 85 in a conventional manner, it being understood that proper pressure fluid supply means are provided for selectively supplying hydraulic fluid to the hydraulic motor 85 when it is desired to either extend or retract each jackleg 81.

In the instant preferred embodiment, the two jackleg assemblies 80 extend laterally of the boom assembly so that the jacklegs 81 can be used to provide two points of a three-point support arrangement, with the third point being supplied by the tool 20 or the outer end of the dipper stick 18.

In addition, the preferred embodiment of the stabilizer power device 84 is provided with a reenforcing and protective cage assembly over each hydraulic cylinder 85, the reenforcing assembly being comprised of four parallel tension rods 91, rigidly secured at the lower ends thereof to an apertured bracket 92 and at the upper ends thereof to another apertured bracket 93 disposed over the respective ends of the cylinder 85.

A control pedestal or column 95 is rigidly secured to the upper surface of the top plate 37, such as by welding, for supporting controls 97 for operating the digger. An operator's seat 96 is also secured to the plate 37. The controls 97 are comprised of a plurality of upwardly extending, manually operated control levers extending above the column 95 for controlling the power devices 19, 21, 33, and 84 by means of control valves secured within the column 95. The hydraulic lines to each of the power devices 19, 21, 33, and 84 are not shown, but are conventionally connected thereto, each of the power devices being of a double-acting type.

A pair of hydraulic lines 98 and 99 are shown leading from the control column 95, FIG. 1, to a pump and a sump, respectively in a conventional fluid pressure system. Each of the fluid lines 98 and 99 are connected to a corresponding line on the vehicle by a quick disconnect coupling device 100 having shut-off valves for preventing loss of fluid from the line upon separation of the coupling so that the vehicle carrying the pressure fluid supply can be readily separated from the demountable unit 15. The quick disconnect coupling devices, which can be of any conventional type, are advantageous when it is desired to disconnect the digging apparatus 15 from the vehicle 10.

To detach or separate the unit 15 from the vehicle 10, the stabilizer legs 81 are preferably extended downwardly by extending the stabilizer power device 84 until the feet 82 bear against or are near the ground or other supporting surface. The bucket 20 is then lowered to the ground or supporting surface as in FIG. 1, if it is not already bearing thereagainst, by properly manipulating the controls 97 atop the pedestal-like column 95.

The latch release lever 77 is then tilted in a counterclockwise direction sufficiently to retract the latch members 61 and to allow the box-like frame F to tilt in a clockwise directions, as the latter is viewed in the drawings, about the trunnions 50, or the legs 81 if the latter are on the ground, to clear the latch members 61 and the top of the frame F from under the latching member 62. There is sufficient spacing between the top of the frame F and the member 62 to permit the tilting movement of the frame. The initial tilting movement of the box-like frame F after the release of the latch members 61 may be effected by shortening the lift motor 35. This may be done by supplying fluid pressure to the motor 35 to cause the shortening thereof and the tilting of the frame F or the opposite side of the motor 35 could be connected to drain and the weight of the frame F allowed to effect the tilting. If desired the dipper stick motor may be operated to tilt the frame F about the trunnions 50 or the legs 81.

Figure 5:
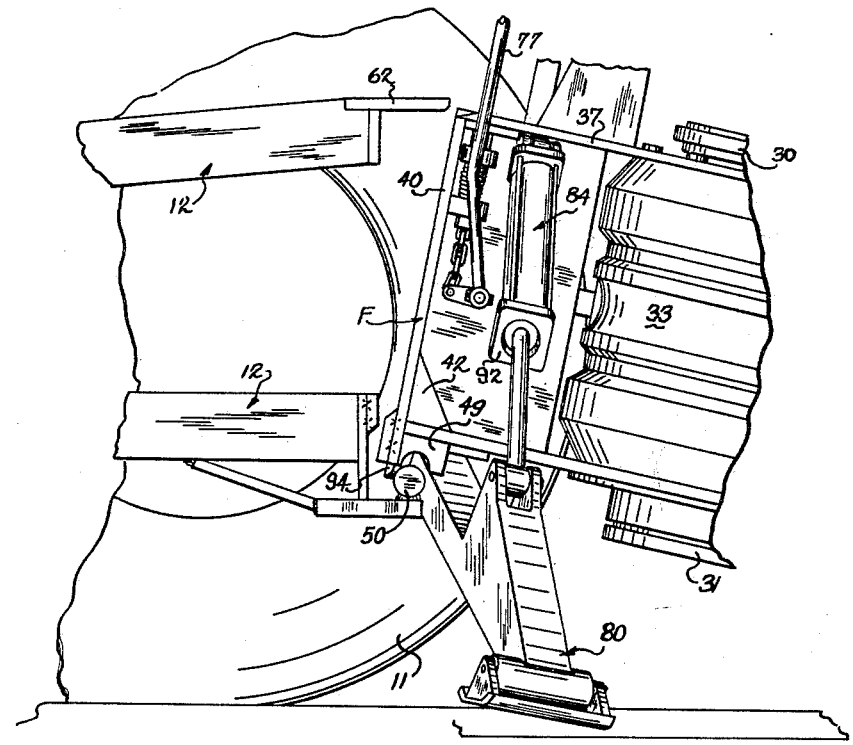
FIG. 5 shows a fragmentary view similar to FIG. 4, but with the stabilizer legs downwardly extended and the equipment being in an almost completely dismounted position.
Figure 6:
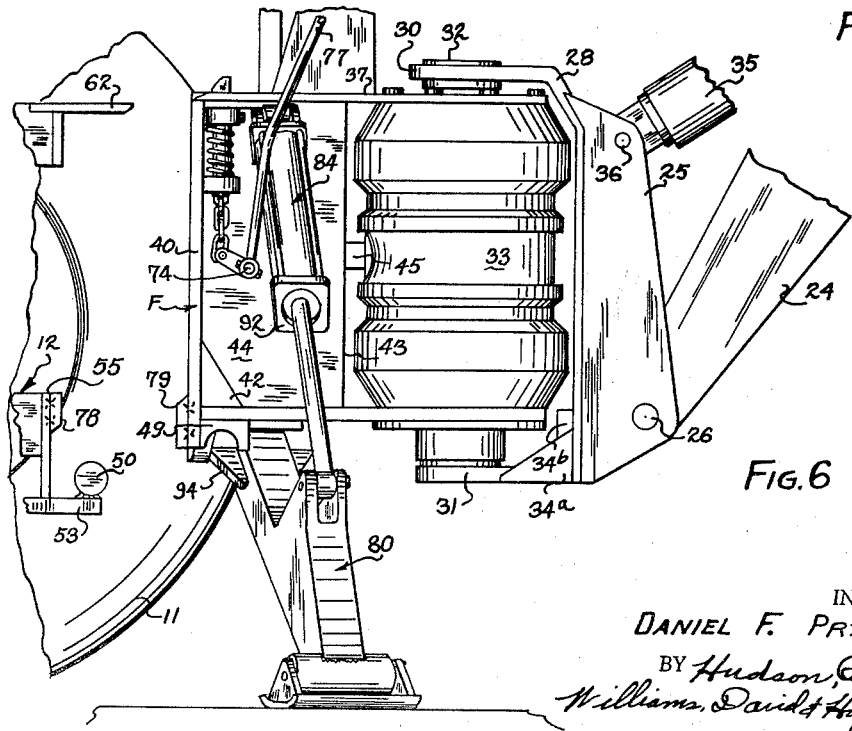
FIG. 6 is a view similar to FIG. 5, but with the boom completely dismounted from the vehicle and parked upon the stabilizer legs after the vehicle has been moved a short distance away from the dismounted boom.

The stabilizers 80 are then preferably operated to raise the box-like frame F so that the bearing blocks 49 clear the trunnions 50 shown in FIG. 5. When the bearing blocks 49 clear the trunnions 50 the hydraulic lines 98, 99 may be disconnected from the vehicle and the vehicle driven away. It should be further noted that the outriggers 80 need not necessarily be operated to raise the frame F to clear the bearing blocks 49 and the trunnions 50. Should the motor 35 be shortened with the outriggers on the ground, the unit 15 will rock about the legs 81, to effect a lifting of the bearing blocks 49 from the trunnions 50.

When the lines 98, 99 have been disconnected from the vehicle, the hydraulic motors 19, 33, 35 and 84 are locked in position by reason of the fluid trapped therein. It is conceivable, however, that the fluid in the motors will leak past the pistons of the motors and that the frame F will settle to the ground. The motors, however, can be operated to restore the unit 15 to its prior condition where the unit is supported by the stabilizers 80 and the bucket 20 by hooking up the lines 98 and 99 to a source of fluid pressure supply and manipulating the control levers 97 to operate the motors 84.

It will be appreciated that the remounting of the unit 15 can be accomplished by reconnecting the couplings 100 in the lines 98 and 99 and, if necessary, further extending the jacklegs 81 by supplying additional pressure fluid to the jackleg power devices 84, so that the digger's box-like demounting frame is sufficiently elevated for permitting the trunnions 50 to be positioned in juxtaposition with the bearing blocks 49. The pivoting of the box-like demounting frame in a counterclockwise direction about the trunnions 50 is accomplished by elongating the cylinder power device 35 and, if necessary, readjusting the jacklegs 81 so that the bearing blocks 49 are seated upon the trunnions 50 and the locking block 79 is properly positioned in relationship with its complementary mating locking block 78 on the tractor support frame 12, as seen in FIG. 1. The remounting of the unit 15 is secured when the latches 61 are properly seated in the corresponding female recesses in the recess plate 62.

If it is desired to transport the digger to another location, the jacklegs 81 are retracted and the main boom 24 is elevated by shortening the motor 35 and the digger 15 is free to be transported.

While I have shown and described a specific embodiment in accordance with my invention, it is understood that the same is susceptible of many changes and modifications, as known to a person skilled in the art, and I intend to cover all such changes and modifications coming within the scope of the appended claims.

Having described my invention, I claim:

1. A vehicle including a detachable frame having a vertically swingable boom mounted thereon and comprised of two sections pivoted for relative swinging movement about a horizontal axis parallel to the axis about which the said boom swings vertically and fluid pressure motors for swinging said boom vertically and for relatively moving said sections about said horizontal axis, said frame having an operating position on said vehicle and further comprising vertically extendible jackleg means and fluid pressure motor means for operating said jackleg means, an operator's control station on said frame including control valve means for said motors and said motor means, flexible fluid pressure conduits extending between said frame and vehicle and of sufficient length to accommodate separation of said frame and vehicle while maintaining the fluid pressure connection therebetween and including quick detachable connections for breaking said conduits, said connections including shut-off valves for closing the separated ends of the conduits, attaching means detachably connecting said frame to said vehicle comprising cooperating bearing members on said vehicle and frame, said bearing members supporting said frame for rocking movement from said operating position to an inclined position and said bearing members being separable by relative movement between said vehicle and frame as units when said frame is in said inclined position, means on said frame and vehicle and effective upon angular movement of said frame from said inclined position to said operating position to prevent separation of said bearing members when said frame is in said operating position, and releasable latching means separate from said means on said frame and vehicle for preventing separation of said frame and vehicle when said frame is in said operating position for releasably locking said frame and vehicle against relative angular movement on said bearing members and engaged by angular movement of said frame from said inclined position to said operating position.

2. A vehicle including a detachable frame having a vertically swingable boom mounted thereon and comprised of two sections pivoted for relative swinging movement about a horizontal axis parallel to the axis about which the said boom swings vertically and fluid pressure motors for swinging said boom vertically and for relatively moving said sections about said horizontal axis, said frame further comprising vertically extendible jackleg means and fluid pressure motor means for operating said jackleg means, an operator's control station on said frame including control valve means for said motors and said motor means, flexible fluid pressure conduits extending between said frame and vehicle and of sufficient length to accommodate separation of said frame and vehicle while maintaining the fluid pressure connection therebetween and including quick detachable connections for breaking said conduits, said connections including shut-off valves for closing the separated ends of the conduits, attaching means detachably connecting said frame to said vehicle comprising cooperating bearing members on said vehicle and frame, said bearing members being separable by relative movement as units between said vehicle and frame, and releasable latching means for locking said frame and vehicle against relative movement, said bearing members comprising a trunnion on one of said frame and vehicle and a mating member on the other of said frame and vehicle with said mating member having a recess opening in a vertical direction whereby said trunnion and mating member are movable relative to each other in a vertical direction to provide separation therebetween, locking blocks on said vehicle and frame engaged with each other to prevent vertical movement of said frame to separate said trunnion and mating member and relatively moved on pivotal movement of said frame on said trunnion to clear each other whereby said frame is vertically movable relative to said vehicle to separate said trunnion and mating member, said releasable latching means locking said frame against rotation from the position wherein said locking blocks are engaged.

3. A vehicle as defined in claim 2 wherein said locking block on said vehicle has a downwardly facing surface inclined inwardly with respect to the vehicle and adapted to mate with a complemental surface on the locking block on said frame.

4. In a vehicle mounted equipment, an equipment mounting frame having a pair of laterally spaced apart and substantially aligned bearing blocks secured thereto and adapted to seat upon and pivot about the axis of complementary cylindrical trunnions mounted on the vehicle, said bearing blocks having recesses in which said trunnions seat and which open downwardly whereby said bearing blocks are movable upwardly with respect to said trunnions, plunger means carried by said equipment mounting frame above said bearing blocks and adapted to normally extend into a complementary latching recess, means for receiving said plunger means on the vehicle, an operator's seat carried by the equipment mounting frame, actuatable means carried by said equipment mounting frame, actuatable means carried by said equipment mounting frame to be actuated by an operator for retracting said plunger means and releasing and permitting said equipment mounting frame to tilt about said cylindrical trunnions, complementary locking block means on the vehicle and frame for preventing vertically upward unseating of said bearing blocks on said cylindrical trunnions comprising a block on said vehicle having a surface inclined downwardly and inwardly toward said vehicle and a block on said frame having a surface adapted to mate with the said surface on said vehicle block and engaging the said surface on said vehicle block when said plunger means is engaged and disengaged from said surface on said vehicle block by rotation of said frame on said trunnions to clear said blocks, said frame being locked against vertical movement relative to said vehicle when said surfaces are engaged and adapted to move clear of said vehicle when said plunger is released and said frame rotated to clear said blocks.

5. In a vehicle mounted equipment, an equipment mounting frame having a bearing block adapted to be mated with a second bearing block mounted on the vehicle to support said frame on the vehicle, one of said bearing blocks comprising a trunnion and the other of said bearing blocks comprising a recess opening in a vertical direction and adapted to seat said trunnion and preventing relative separatory movement between said bearing blocks when said trunnion is seated in all directions except a generally upward direction, said bearing blocks being adapted to be mated with said frame in a tilted position and the frame then rotated about said trunnions to an operative position, releasable latching means on said frame engaged by the rotation of said frame to its said operative position to lock said frame against rotation on said trunnion, a locking block on said frame adapted to cooperate with a locking block on said vehicle and having an inclined face adapted to mate with a cooperating surface on the block on said vehicle to limit said frame against upward movement relative to said vehicle when said latching means is latched and cleared from the locking block on said vehicle by rotation of said frame from said operative position to said tilted position whereby said frame may be lifted from said vehicle.

References Cited in the file of this patent

UNITED STATES PATENTS

| | | |
|---|---|---|
| 2,410,953 | Messenger et al. | Nov. 12, 1946 |
| 2,477,980 | Hardy | Aug. 2, 1949 |
| 2,595,864 | Lowry | May 6, 1952 |
| 2,636,568 | Rutishauser | Apr. 28, 1953 |
| 2,701,072 | Chambers | Feb. 1, 1955 |
| 2,702,137 | Ives | Feb. 15, 1955 |
| 2,833,432 | Foster | May 6, 1958 |
| 2,834,489 | Davis | May 13, 1958 |
| 2,846,094 | Pilch | Aug. 5, 1958 |
| 2,938,347 | Sturgis | May 31, 1960 |
| 3,003,651 | Halopainen | Oct. 10, 1961 |

FOREIGN PATENTS

| | | |
|---|---|---|
| 225,304 | Switzerland | Apr. 16, 1943 |